United States Patent
Tiwari et al.

(10) Patent No.: US 10,917,469 B2
(45) Date of Patent: Feb. 9, 2021

(54) READ PERFORMANCE ENHANCEMENT BY ENABLING READ FROM SECONDARY IN HIGHLY AVAILABLE CLUSTER SETUP

(71) Applicant: Western Digital Technologies, Inc., Irvine, CA (US)

(72) Inventors: Manoj Kumar Tiwari, Bangalore (IN); Avik Sil, Bangalore (IN); Swamy Gowda Jayaramu, Bangalore (IN); Shibabrata Mondal, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 229 days.

(21) Appl. No.: 15/465,782

(22) Filed: Mar. 22, 2017

(65) Prior Publication Data
US 2018/0278685 A1 Sep. 27, 2018

(51) Int. Cl.
*H04L 29/08* (2006.01)
(52) U.S. Cl.
CPC ...... *H04L 67/1097* (2013.01); *H04L 67/1095* (2013.01)
(58) Field of Classification Search
CPC ............... H04L 67/1097; H04L 67/1095
USPC ............................................. 709/219
See application file for complete search history.

(56) References Cited

U.S. PATENT DOCUMENTS

| | | | |
|---|---|---|---|
| 7,010,617 B2 | 3/2006 | Kampe et al. | |
| 7,475,280 B1 | 1/2009 | Schlomer et al. | |
| 7,596,712 B1 | 9/2009 | Gole et al. | |
| 8,316,182 B2* | 11/2012 | Augenstein | G06F 1/3203 711/117 |
| 8,498,967 B1 | 7/2013 | Chatterjee et al. | |
| 8,621,146 B1 | 12/2013 | Miller et al. | |
| 8,683,485 B2 | 3/2014 | Jennas, II et al. | |
| 9,020,895 B1* | 4/2015 | Rajashekar | G06F 16/2308 707/639 |
| 9,026,737 B1* | 5/2015 | Armangau | G06F 12/0822 711/118 |
| 9,100,330 B1* | 8/2015 | Noveck | H04L 47/283 |
| 9,977,687 B2* | 5/2018 | Kottomtharayil | G06F 9/505 |

(Continued)

OTHER PUBLICATIONS

Ye, Yunqui et al. "Secure, Highly Available, and High Performance Peer-to-Peer Storage Systems" dated 2008, pp. 383-391, IEEE Xplore.

(Continued)

*Primary Examiner* — Nicholas R Taylor
*Assistant Examiner* — Chong G Kim
(74) *Attorney, Agent, or Firm* — Patent Law Works LLP

(57) ABSTRACT

A computer-implemented method for efficiently accessing a secondary storage in highly available clustered storage environment may include receiving a client-initiated data request at a secondary server coupled to a secondary storage; determining request information about the client-initiated data request; determining with the secondary server whether to process the client-initiated data request on the secondary storage based on the determined request information; and responsive to determining that the secondary server should process the client-initiated data request, processing the client-initiated data request by the secondary server to retrieve data from the secondary storage.

20 Claims, 8 Drawing Sheets

(56) References Cited

U.S. PATENT DOCUMENTS

| | | | |
|---|---|---|---|
| 2006/0143497 A1* | 6/2006 | Zohar | G06F 11/2058 714/6.23 |
| 2012/0017040 A1* | 1/2012 | Chatterjee | G06F 11/2064 711/113 |
| 2012/0290747 A1* | 11/2012 | Doatmas | G06F 3/0617 710/38 |
| 2012/0311376 A1* | 12/2012 | Taranov | G06F 11/2097 714/4.11 |
| 2013/0117225 A1* | 5/2013 | Dalton | G06F 16/119 707/623 |
| 2013/0318297 A1* | 11/2013 | Jibbe | G06F 3/061 711/114 |
| 2014/0047263 A1* | 2/2014 | Coatney | G06F 11/2023 714/4.11 |
| 2014/0201137 A1* | 7/2014 | Vibhor | H04L 29/0854 707/610 |
| 2015/0046668 A1* | 2/2015 | Hyde, II | G06F 3/0689 711/162 |
| 2015/0058663 A1* | 2/2015 | Schmidt | G06F 11/203 714/6.24 |
| 2015/0227318 A1* | 8/2015 | Banka | G06F 3/0617 709/202 |
| 2015/0341466 A1* | 11/2015 | Sah | H04L 67/2814 707/770 |
| 2015/0347244 A1* | 12/2015 | Blood | G06F 16/00 714/16 |
| 2015/0370502 A1 | 12/2015 | Aron et al. | |
| 2016/0179637 A1* | 6/2016 | Winokur | G06F 11/2005 714/5.1 |
| 2017/0161349 A1* | 6/2017 | Harris, Jr. | G06F 11/2069 |
| 2018/0124174 A1* | 5/2018 | Swallow | H04L 67/1097 |
| 2018/0137139 A1* | 5/2018 | Bangalore | H04L 67/1097 |
| 2018/0143880 A1* | 5/2018 | Dornemann | G06F 11/203 |

OTHER PUBLICATIONS

Unknown Author "StorTrends Whitepaper: Data Continuity Through High Availability" dated 2012, 13 pages, American Megatrends Inc.

* cited by examiner

READ PERFORMANCE ENHANCEMENT BY ENABLING READ FROM SECONDARY IN HIGHLY AVAILABLE CLUSTER SETUP

FIELD OF THE INVENTION

The present disclosure generally relates to clustered data storage systems. In particular, the present disclosure relates to efficiently accessing data in a secondary storage of a highly available clustered storage environment.

BACKGROUND

Clustered storage includes two or more storage servers working together to increase performance, capacity, and/or reliability. Clustering distributes workloads to each server, manages the transfer of workloads between servers, and provides access to all files from any server regardless of the physical location of a file. Highly Available (HA) clustered storage requires block devices be synchronized between two servers for use as a file system. Two block devices comprise a cluster that uses a Primary-Secondary (or Master-Slave) configuration, in which only one block device is active at a time.

A common performance measurement of a clustered storage is the amount of time required to satisfy client requests. In conventional systems, this time consists of a disk-access time and a small amount of CPU-processing time. However, in a clustered storage, a remote access has additional overhead due to the distributed structure. This includes the time to deliver the request to a server, the time to deliver the response to the client, and for each direction, a CPU overhead of running the communication protocol software.

Current state-of-art technologies deliver all client requests to a primary storage server for data access, no matter where the client requests are initiated and which types of requests they are. This may take extra time to process in a distributed system, and thus unavoidably slow down the performance of a clustered storage. For instance, a client request received at a server associated with a secondary storage needs to be first delivered to the primary storage for accessing the data in the primary storage. The data retrieved from the primary storage also needs to be transmitted back to client through the server associated with the primary storage. For a distributed system where the primary storage and secondary storage servers may be separated by a long distance, each data transmission through the network between the primary and secondary storage servers may take extra time, which unavoidably slows down the response time in the client side.

SUMMARY

The present disclosure relates to systems and methods for efficiently accessing data in a secondary storage of a highly available clustered storage environment. According to one innovative aspect of the subject matter in this disclosure, a system includes a manager configured to receive a client-initiated data request for accessing data, the manager coupled to receive the client-initiated data request, the manager for processing and distributing the client-initiated data request; a primary server having an input and an output for processing the client-initiated data request, the input of the primary server coupled to the manager to receive the client-initiated data request, the output of the primary server coupled to the manager to provide data in response to the client-initiated data request; a primary storage having an input and an output for storing data and providing data, the input and the output of the primary storage coupled to the primary server for providing data responsive to the client-initiated data request via the primary server; a secondary server having an input and an output for processing the client-initiated data request, the input of the secondary server coupled to the manager to receive the client-initiated data request, the secondary server including a direct secondary interface module for responding directly to the client-initiated data request by retrieving data and providing it to the manager; and a secondary storage having an input and an output for storing data and providing data, the input and the output of the secondary storage coupled to the secondary server for providing data responsive to the client-initiated data request via the secondary server.

In general, another innovative aspect of the subject matter described in this disclosure may be implemented in a method that includes receiving a client-initiated data request at a secondary server coupled to a secondary storage; determining request information about the client-initiated data request; determining with the secondary server whether to process the client-initiated data request on the secondary storage based on the determined request information; and responsive to determining that the secondary server should process the client-initiated data request, processing the client-initiated data request by the secondary server to retrieve data from the secondary storage.

Other embodiments of one or more of these aspects include corresponding systems, apparatus, and computer programs, configured to perform the actions of the methods, encoded on computer storage devices. These and other implementations may optionally include one or more of the following features and/or operations.

For example, the determined request information includes one or more from the group of: a request type, a synchronization status of a primary storage and the secondary storage associated the requested, and a location of the secondary storage associated with the requested relative to the secondary server.

In other examples, the secondary server processes the client-initiated data request on the secondary storage when the request type is a read request, the primary storage and secondary storage associated with the requested data are in synchronization, and the location of the secondary storage associated with the requested data is in close proximity to the secondary server; the secondary server is clustered with a primary server in a highly available clustered storage system, and a primary storage coupled to the primary server and the secondary storage coupled to the secondary server are mirrored storage connected through a network; the determining with the secondary server whether to process the client-initiated data request includes determining whether the client-initiated data request is a read request, determining whether the secondary storage and the secondary server are on a same node, or determining whether a primary storage is synchronized with the secondary storage.

These embodiments are particularly advantageous in a number of respects. For instance, the technology described herein is able to improve responsiveness of client-initiated data request towards data stored in a highly available clustered storage environment, without a sacrifice of consistency and accuracy. Additionally, the methods can be implemented without necessarily modifying existing storage systems. For instance, the methods interoperate well with many existing network-attached and/or direct-attached storage systems, and thus provide a convenient means to access and manipulate data in a clustered environment. It should be understood, however, that this list of features and advantages is not all-inclusive and many additional features and advantages are contemplated and fall within the scope of the present disclosure. Moreover, it should be understood that the language used in the present disclosure has been principally selected for readability and instructional purposes, and not to limit the scope of the subject matter disclosed herein.

BRIEF DESCRIPTION OF THE DRAWINGS

The present disclosure is illustrated by way of example, and not by way of limitation in the figures of the accompanying drawings in which like reference numerals are used to refer to similar elements.

DETAILED DESCRIPTION

The present disclosure describes systems and methods for efficiently accessing data in a secondary storage of a highly available clustered storage environment. In the following descriptions, for purposes of explanation, numerous specific details are set forth in order to provide a thorough understanding of the present disclosure. However, it should be noted that the present disclosure might be practiced without these specific details.

A clustered Highly Available (HA) storage system contains one or more of a primary server and a secondary server for handling client-initiated data requests (or simply "client requests"). Each of the primary server and secondary server may couple to a primary storage or a secondary storage, respectively, to manage data in the corresponding storage. In normal operations, the primary server may act as an active server to handle all I/O requests. A secondary server may forward a received client request to a primary server to access data in the primary storage coupled to the primary server. In some embodiments of the present disclosure, the secondary server may handle a received client-initiated data request by directly routing the request to the coupled secondary storage for data request and access, without communicating with the primary server and the coupled primary storage even when the primary server and the primary storage work in normal operation.

Figure 1:
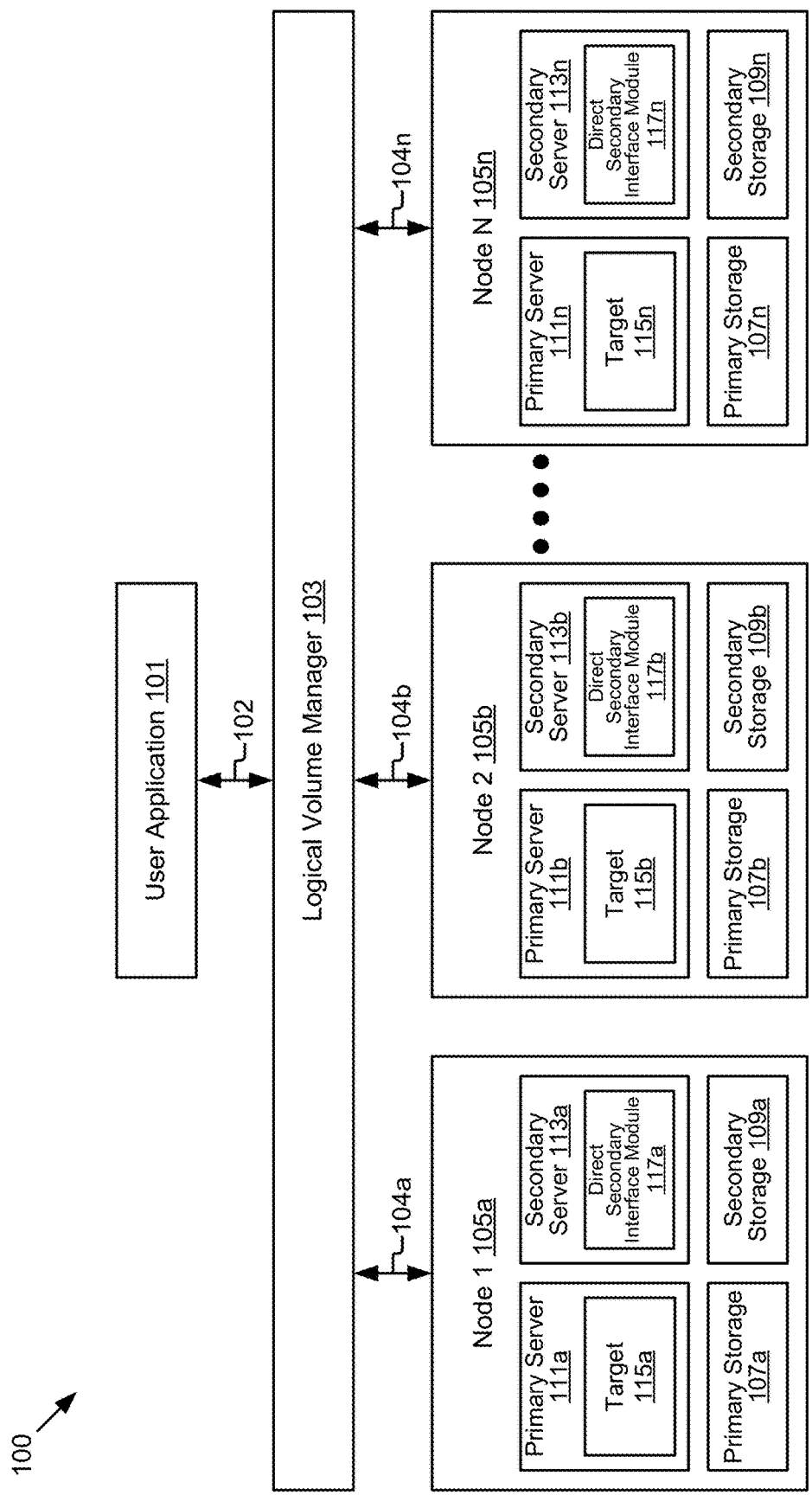
FIG. 1 is a block diagram illustrating an example clustered storage system.

FIG. 1 is a block diagram illustrating an example clustered storage system 100 for enabling a read path directly from a secondary storage in a Highly Available (HA) clustered storage setup. As illustrated, the system 100 includes a user application 101, a logical volume manager 103, and a plurality of storage nodes 105a, 105b, ..., 105 n (together or individually referred to as 105) that aggregate to form a shared storage network managed by the logical volume manager 103. Each storage node 105 may include a primary server 111a, 111b, ..., or 111n (together or individually referred to as 111), a coupled primary storage 107a, 107b, ..., or 107n (together or individually referred to as 107), a secondary server 113a, 113b, ..., or 113n (together or individually referred to as 113), and a coupled secondary storage 109a, 109b, ..., 109n (together or individually referred to as 109).

In some embodiments, the user application 101 may communicate with the logical volume manager 103 via a signal line 102, to transmit client-initiated data requests. The logical volume manager 103 may communicate with each of the plurality of storage nodes 105a, 105b, ..., 105n via signal lines 104a, 104b, ..., 104n for actual data access and retrieval. Although not illustrated, each storage node 105 may communicate with one another in the pool of storage nodes using a network-based approach for necessary data exchange and communication.

The user application 101 includes software, code, logic, or routines that keep track of the directory structure of data stored in the clustered storage system 100. In some embodiments, the user application 101 may work in conjunction with the logical volume manager 103 to read from or write to the pool of storage nodes 105 on behalf of clients.

In some embodiments, the user application 101 may send a client request to a server in the clustered storage system 100 through a location-based approach. For instance, the use application 101 may determine a location of a client request based on a network node from which the client request is received within a network. In some embodiments, the user application 101 may additionally select a corresponding server from a plurality of servers distributed throughout the network based on the identified location of the client request. The user application 101 may determine the corresponding server based on the server location of the selected server relative to the network node associated with the client location. The user application 101 may communicate with the logical volume manager 103 to obtain the server location of the selected server. Upon selection of the corresponding server, the user application 101 may then guide the client request to be sent to the selected server based on the location.

In some embodiments, the user application 101 may send a client request to a server directly attached to a client device initiating the client-initiated data request.

The logical volume manager 103 includes software, code, logic, or routines that perform space allocation on clustered storage devices (e.g., nodes 105). In some embodiments, the logical volume manager 103 may concatenate, stripe together, or otherwise combine block devices into larger virtual ones that a user can re-size or move, potentially without interrupting system use. For instance, the logical volume manager 103 may generate one or more linear logical volumes by aggregating space from one or more physical volumes into one logical volume. For instance, the logical volume manager 103 may create a 120 gigabyte (GB) linear logical volume from two 60 GB disks. The logical volume manager 103 may achieve this by concatenating the two 60 GB physical storage. In some embodiments, the logical volume manager 103 may configure more than one linear logical volume. For instance, for the above example, the logical volume manager 103 may create two liner logical volumes with a size of 40 GB and 80 GB, respectively. By carving up smaller volumes to the exact size needed by each application, the logical volume manager 103 may optimize storage sources for the most-effective storage deployment.

In some embodiments, the logical volume manager 103 may create additional logical volumes as necessary, or convert the created logical volumes to different formats to meet clients' requests. For instance, the logical volume manager 103 may create a Redundant Array of Independent Disks (RAID) logical volume, a thinly-provisioned logical volume, a snapshot volume, a thinly-provisioned snapshot volume, a cache volume, etc. For instance, the logical volume manager 103 may convert an existing RAID logical volume to a linear logical volume, converting a linear logical volume to a RAID device, converting a mirrored logical volume management device to a RAID device, etc.

In some embodiments, the logical volume manager 103 may create one or more mirrored logical volumes. The logical volume manager 103 may achieve this by cooperating with one or more servers managing the mirrored logical volumes, such as the primary servers 111a-n and the secondary servers 113a-n. A mirrored volume maintains identical copies of data on a different device. When data are written to one device, it may be written to a second device as well, thus mirroring the data to provide protection in case of a failure of one device. For instance, the primary storage 107 and the secondary storage 109 may be the mirrored volumes created by the logical volume manager 103. In some embodiments, more than one mirrored logical volume may be created, not only for failure protection, but also for improved data access time in case one node receives more access requests than it can handle in a timely fashion. Additionally, distribution of a mirrored logical volume of data in a location close to or similar with location of the main client requests also avoids network-caused delay of data processing.

In some embodiments, the logical volume manager 103 may additionally distribute I/O operations within the aggregated storage nodes 105. For instance, the logical volume manager 103 may distribute a client-initiated data request to a specific primary server 111 or secondary server 113 within the aggregated storage nodes 105. In some embodiments, primary servers 111 and secondary servers 113 in the storage nodes 105 may be both addressable from the logical volume manager 103. The logical volume manager 103 may maintain a mapping of Logical Block Numbers (LBNs) to the primary servers 111 and the secondary servers 113 that describe the locations of the LBNs in the primary servers 111 and secondary servers 113. Based on an offset in the client-initiated data request, the logical volume manager 103 may then determine a corresponding LBN and associated primary server 111 or secondary server 113, and distribute the client-initiated data request to the corresponding server. In some embodiments, the logical volume manager 103 may immediately pause ongoing I/O operations in case of failures of the data associated with the I/O operations.

A storage node 105, or simply "a node 105", is a physical unit with its own local persistent storage, and a CPU with one or more cores for actual I/O executions. In the illustrated embodiment, a node 105 includes two servers, e.g., a primary server 111 and a secondary server 113, which form a cluster. Each of the primary server 111 and secondary server 113 has one or more attached storage units, for example, the primary storage 107 and the secondary storage 109 respectively. Each primary server 111 may additionally include a target 115a, 115b, . . . , or 115n (together or individually referred to as 115), and each secondary server 113 may additionally include a direct secondary interface module 117a, 117b, . . . , or 117n (together or individually referred to as 117).

In some embodiments as shown in FIG. 1, the primary server 111 and the secondary server 113 are co-located, for example, in the same data center. Although illustrated in a single block of a node 105, in other embodiments, the primary server 111 and the secondary server 113 may be not located exactly in the same location, but rather in a widely-distributed format. For instance, the primary server 111a may be located in a location far from the secondary server 113a. Similarly, in some embodiments, a primary storage and a secondary storage in the same node 105 may not be mirrored storages. For instance, the primary storage 107a and the secondary storage 109a may not be mirrored storages. The secondary storage 109a may be a mirrored storage of the primary storage 107n. In some embodiments, mirrored storages may be data-orientated. For instance, the secondary storage 109a may be a mirrored storage of the primary storage 107a for data A, and simultaneously may be a mirrored storage of the primary storage 107n for data B.

In some embodiments, the node 105 may additionally include a memory and/or an IP address for necessary functions. Although not illustrated, the node 105 may have a first network that connects a primary storage 107/primary server 111 to a secondary storage 109/secondary server 113. Additionally, as previously discussed, each node 105 may connect to one or more of other nodes 105 through a second network, which may be the same as or different from the first network.

The primary server 111 or secondary server 113 is a type of server acting to store, access, secure, and manage digital data, files, and services in the corresponding storages. The primary server 111 or the secondary server 113 is a purposely built server used for storing and accessing small to large amount of data over a shared network. Served as a central point for data storage and access, a primary server 111 or secondary server 113 may be used for routine or frequently used data storage and access, or it may serve as a backup server for stocking backup data. For instance, the primary server 111 may be used for routine data storage and access, while the secondary server 113 may serve as a backup server. In some embodiments, the secondary server 113 may also be used for routine data storage and access, as further discussed regarding the direct secondary interface module 117.

In some embodiments, the primary server 111 and secondary server 113 may have different components to execute corresponding functions. For instance, the primary server 111 may include a target 115 to receive commands for data storage and access, while the secondary server 113 may have a direct secondary interface module 117 for handling client-initiated data requests differently from the primary server 113. Although illustrated as separated, in some embodiments, a primary server 111 or secondary server 113 may be located in an attached primary storage 107 or secondary storage 109, respectively.

Although not illustrated, in some embodiments, a primary server 111 or secondary server 113 may optionally include one or more additional components, for example, a processor, a memory, a network adaptor, a storage adaptor, etc. The processor is the central processing unit of each storage server, and serves to control overall operations in each storage server by executing software stored in the memory located in the server. The memory stores the operating system of each server, and may represent any form of random access memory (RAM), read-only memory (ROM), flash memory, or the like, or a combination of such devices. The network adaptor provides each server an ability to communicate with remote devices through the network (not shown). The storage adaptor allows each server to access to corresponding storage units to which a server is coupled.

In some embodiments, the operating system of the primary server 111 and secondary server 113 may include one or more protocols and corresponding drivers to allow the primary server 111 or secondary server 113 to communicate with the clients through a network. For instance, the primary server 111 or secondary server 113 may include one or more high-level protocols, such as NFS, CIFS, HTTP, TCP/IP, PCP, and iSCSI, for connecting each storage units to the client devices.

In some embodiments, the operating systems of the primary server 111 and secondary server 113 may additionally include one or more protocols in different levels to allow the primary server 111 and secondary server 113 to connect to different corresponding storage devices. For instance, the operating systems of the primary server 111 and secondary server 113 may include low-level storage access protocols, such as Fiber Channel Protocol (FCP) or SCSI, for communication with each other over the network, such as Ethernet or Fiber Channel.

The direct secondary interface module 117 includes software, code, logic, or routines that monitors for client-initiated data requests received by the secondary server 113. In some embodiments, the direct secondary interface module 117 may communicate with the logical volume manager 103 through the signal line 104. For instance, the direct secondary interface module 117 may receive a client-initiated data request allocated by the logical volume manager 103 to require access to data stored in the clustered storage system 100. Next, the direct secondary interface module 117 may route the request to a primary server 111 associated with the primary storage 107, or directly to a secondary storage 109, as further discussed below with reference to FIGS. 3-6.

The target 115 includes software, code, logic, or routines that manage commands received from other servers in the clustered storage system 100. For instance, the target 115 may receive commands from the direct secondary interface module 117 in a secondary server 113, and provide necessary input/output operations following the received commands. The target 115 may provide to the direct secondary interface module 117 one or more logical unit numbers (LUNs) to support read/write operations in response to the input/output data request initiated from the user application 101. In some embodiments, a target 115 may receive commands not necessarily from a secondary server 113 in the same node 105. For instance, a target 115a may receive commands from a secondary server 113a, a secondary server 113b, or a secondary server 113n. The target 115 may then handle the client requests from different secondary servers 113 by accessing a primary storage 107 to which it is coupled.

The primary storage 107 and secondary storage 109 are two physical storage units that are operational on two different physical machines to provide synchronous block-level data replication. The primary storage 107 and secondary storage 109 may work in a master-slave mode, which only allows one of the two storage devices 107, 109 to be active at a given moment. In some embodiments, the primary storage 107, in combination with the primary server 111, may handle all the I/O requests. In some embodiments, in combination with the direct secondary interface module 117 in the secondary server 113, the secondary storage 109 may handle some of the read request directly in itself.

In some embodiments, the primary storage 107 and the secondary storage 109 are mirrored block devices. The primary storage 107 and the secondary storage 109 may be determined based on which block device is initially and/or preferentially used, or configured to supply data to clients and to modify data from clients. In some embodiments, the primary storage 107 and the secondary storage 109 can be changed. For instance, a secondary storage 109 in an initial configuration can be changed to act as a primary storage 107 in a recovery configuration.

Although FIG. 1 (and portions of FIG. 2B) illustrates the clustered storage system 100 as a number of discrete items, the figure is intended more as a functional description of the various features that may be present in the clustered storage system 100. In practice, it should be understood that items shown separately may be combined and some items may be separated. How features are allocated among the components may also vary from one embodiment to another, and may depend in part on the amount of data that the system must handle. For instance, the actual number of servers and storage units in the clustered storage system 100 may vary from one implementation to another.

Figure 2A:
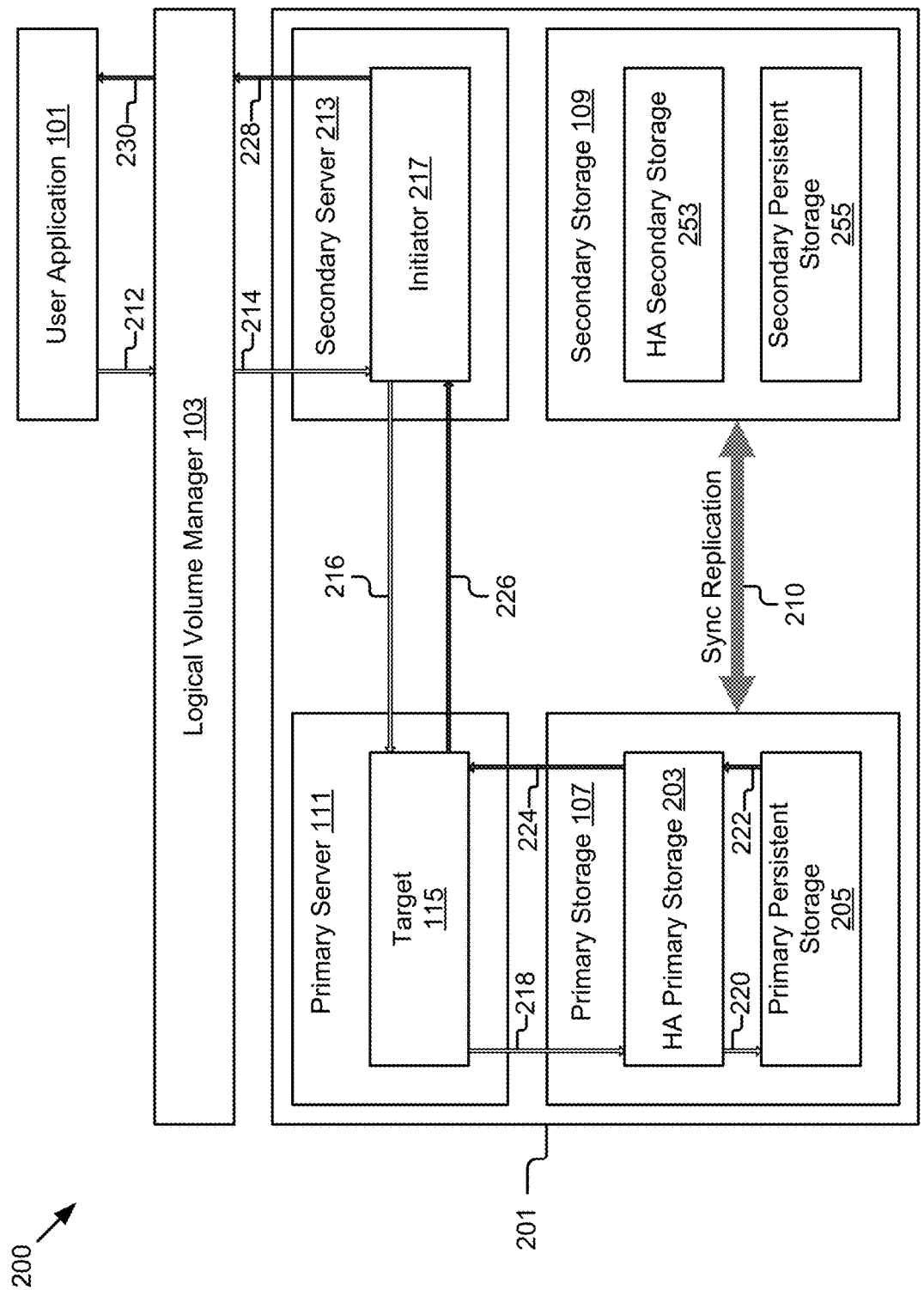
FIG. 2A is a block diagram illustrating a prior art system containing an initiator that routes client-initiated data requests to a target of a primary server.

FIG. 2A illustrates an example prior art system 200 that routes the client-initiated data requests from an initiator 217 to the primary server 111 to access the data stored in the primary storage 111. As shown in FIG. 2A, the example prior art system contains an initiator 217 in a secondary server 213 associated with the secondary storage 109. The initiator 217, upon receiving a data request, issues all data request-based commands to the target 115 of the primary server 111 for data access and request in the primary storage 107. The problem with this architecture as noted above is the added delay and latency introduced by require such routing.

Figure 2B:
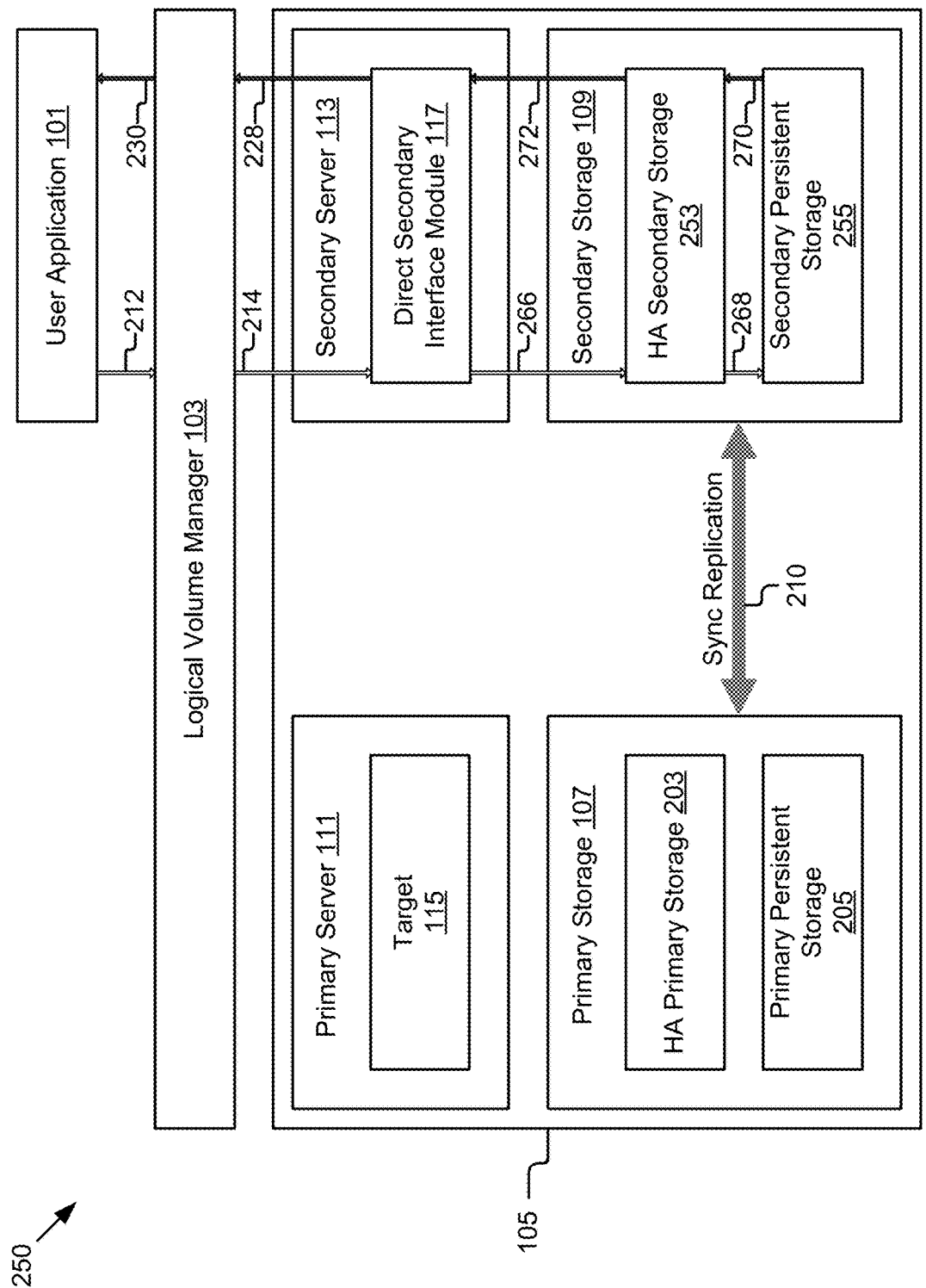
FIG. 2B is a block diagram illustrating an example system containing a direct secondary interface module that routes a client-initiated read request to a secondary storage.

FIG. 2B illustrates an example clustered storage system 250 that routes a client-initiated read request to a secondary storage 109. Compared to an initiator 217 in the secondary server 213 in the prior art system 200, a direct secondary interface module 117 is located in a different secondary server 113 in the currently disclosed system 250. The direct secondary interface module 117, instead of initiating all data request-based commands to a target 115 of the primary server 111, may directly route a client-initiated data request to a secondary storage 109 for accessing the data. The direct secondary interface module 117 may include necessary components to achieve this function, as will be discussed below with reference to FIG. 3.

As shown in FIG. 2B, the direct secondary interface module 117 routes a client-initiated read request to a secondary storage 109. As illustrated by the arrows in the figure (blank arrows suggesting the read I/O request path, while filled arrows indicating the read I/O response path), the system 250 may receive a client-initiated read request at the user application 101. The user application 101 forwards (arrow 212) the read request to the logical volume manager 103 to allocate a corresponding server for handling the request. In the illustrated embodiment, the allocated server is the secondary server 113. The logical volume manager 103 then forwards (arrow 214) the read request to the allocated secondary server 113. Upon receiving the request at the secondary server 113, the direct secondary interface module 117 in the secondary server 113 may determine to route the read request to the secondary storage 109 coupled to the secondary server 113 as discussed elsewhere herein, and then route (arrow 266) the read request to the secondary storage 109. The secondary storage 109 may handle the read request by locating the physical address of the requested data in the secondary persistent storage 255, mediated by the HA secondary storage 253 as depicted by arrow 268. To present the located data to the client, the requested data may be retrieved (arrow 270) from the secondary persistent storage 255. The retrieved data may then be forwarded (arrow 272) to the secondary server 113, mediated through the HA secondary storage 253. The secondary server 113 then forwards (arrow 288) the retrieved data to the logical volume manager 103, and further (arrow 230) to the user application 101 for presenting to the client.

FIG. 2A illustrates a prior art system 200 containing an initiator 217 that routes client-initiated data requests to a target 115 of a primary server 113. For a similar read request, the exact request and response path would be a route comprising arrows 212→214→216→218→220 for the request and a route comprising arrows 222→224→226→228→230 for the retrieved data as illustrated by the blank and filled black arrows in FIG. 2A. Clearly, a client-initiated read data request is routed to a remote primary storage 107 but not to a closer secondary storage 109 for data access in the prior art system 200.

Compared to the prior art system 200, it can be seen that the read request mediated by the direct secondary interface module 117 in the system 250 does not need to route the read request to the primary server 117, thus avoids extra time to transmit the read request from the secondary server 113 to the primary server 111, as illustrated by the request and response path in the prior art system 200. Similarly, extra time to transmit the retrieved data from the primary server 111 to the secondary server 113 may also be eliminated. Without necessarily transmitting the read request and the retrieved data between the primary server 111 and the secondary server 213 in a distributed system, the actual time to process a read request in the disclosed system 250 may be greatly improved, as illustrated by the graph in FIG. 7 as will be described below.

In some embodiments, the primary storage 107 and the secondary storage 109 may include a High Availability (HA) primary storage 203 and a High Availability (HA) secondary storage 253, respectively, for assisting the data duplication between the primary storage 107 and the secondary storage 109, as illustrated in FIG. 2B. Additionally, the primary storage 107 or the secondary storage 109 may respectively include a primary persistent storage 205 and secondary persistent storage 255.

HA primary storage 203 and HA secondary storage 253 include software, code, logic, or routines that harness redundant servers 111, 213 to ensure that the clustered storage system 100 can be continuously operational or provides high uptime. HA storage systems are often used in virtual server environments as a security feature to protect critical virtual machines. HA storage arrays require at least two servers or controllers in case one is lost. For disaster recovery, HA storage requires a secondary storage system to hold critical data and applications the business needs if its primary storage system goes offline. To achieve this, the HA primary storage 203 may replicate the data on a secondary storage 109 by forwarding the data to the HA secondary storage 253. The HA secondary storage 253 then stores a copy of the data on the secondary persistent storage 255 local to the HA secondary storage 253. Although illustrated as separated, a HA primary storage 203 may be integrated into a primary server 111, or even the logical volume manager 103. Similarly, a HA secondary storage 253 may be integrated into a secondary server 113, or the logical volume manager 103.

In some embodiments, the HA primary storage 203 and the HA secondary storage 253 may achieve the replication through a sync replication process 210. The HA primary storage 203 and the HA secondary storage 253 working together may deliver the sync replication 210 between the shared primary server 111 and secondary server 113 using an InfiniBand or Ethernet connection.

The sync replication 210 includes software, code, logic, or routines that ensure that the statuses of the primary storage 107 and secondary storage 109 are synchronous. In some embodiments, the sync replication 210 may be achieved through replication software that is operating in a synchronous mode. When an initiating host sends a write command to a primary storage 107, the primary storage 107 writes the data to the primary persistent storage 205. Simultaneously, the primary storage 107 may forward the data to a secondary storage 109 at another site. The secondary storage 109 writes the data to the coupled secondary persistent storage 255, and then sends acknowledgment to the primary storage 107, indicating that the command completed successfully. Only after receiving acknowledgments from both the primary persistent storage 205 and the secondary storage 209, does the primary storage 107 send acknowledgment of successful completion to the initiating host.

In some embodiments, the sync replication 210 may additionally include a resynchronization process. This may happen under the situations when the primary storage 107 and secondary storage 109 are disconnected due to a network failure, or when network congestion may obstruct traffic between the primary and secondary storages, or one of the storages suffers hardware or software failures. When such a disconnection occurs, the data stored on the secondary storage 109 may become out-of-sync with the primary storage 107. For instance, data on the primary storage 107 may have been added, deleted, or modified during the period of disconnection, and these changes would not be reflected on the data stored on the secondary storage 109 due to the connection failure. In this and other situations, through the resynchronization, the sync replication 210 may check the data stored on the secondary storage 109 and modify the data as necessary to bring it in-sync with the data stored on the primary storage 107. For instance, the sync replication 210 may identify and delete data on the secondary storage that have been deleted on the primary storage 107 during the period of the connection failure. In some embodiments, the sync application 210 may automatically resynchronize only the data that has changed without having to resynchronize the data that has not changed. The sync application 210 may use underlying management layer of a storage to track all data changes, and determine which data should be automatically resynchronized.

The primary persistent storage 205 and secondary persistent storage 255 are actually storage hosting elements that provide physical storage of data. They are the units that ultimately fulfill requests from the perspective of the HA primary storage 203, HA secondary storage 253, the primary server 111, and the secondary server 113. The primary persistent storage 205 and secondary persistent storage 255 may be conventional flash memory devices (e.g. FlashMax cards), magnetic disks, optical disks, or any type of non-volatile storage devices suitable for storing a large amount of data. The primary persistent storage 205 and secondary persistent storage 255 may perform a read or in some conditions a write to a location specified by a request from clients. This data read or write request may be performed on a disk or multiple disks in each persistent storage 205, 255.

Figure 3:
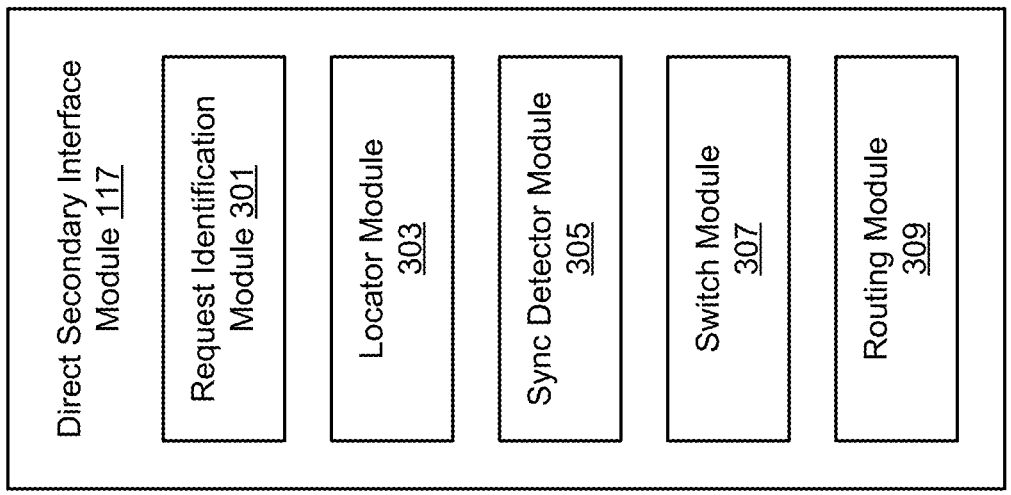
FIG. 3 is a block diagram illustrating an example direct secondary interface module.

FIG. 3 is a block diagram illustrating an example direct secondary interface module 117 according to one embodiment. As shown in FIG. 3, the direct secondary interface module 117 may include a request identification module 301, a locator module 303, a sync detector module 305, a switch module 307, and a routing module 309. Although not illustrated, the direct secondary interface module 117 may include different and/or additional modules other than the ones depicted in FIG. 3. For instance, the direct secondary interface module 117 may include necessary processor(s), memory, and a communication bus that connects a component with another component within or outside the direct secondary interface module 117.

The request identification module 301 includes software, code, logic, or routines that determine a type of client request based on information received from the client-initiated data request.

In some embodiments, a received client request may include a valid field indicating whether the request for data access is valid or not, a transaction type field indicating the type of data access request (e.g. a read or a write), and a request address field specifying the target address of the requested data. The request identification module 301 may directly check the transaction type field of a data access request to determine a type of client request. For instance, the request identification module 301 may identity a client request as a read request based on the information provided in the transaction type field of the request.

In some embodiments, the request identification module 301 may communicate with the logical volume manager 103 to determine a type of data request. For instance, the logical volume manger 103 may identify a type of client request based on the protocols used in an allocated server, in combination with the received client request information.

The locator module 303 includes software, code, logic, or routines that determine a physical location of the requested data or file among a pool of storage devices. Depending on the type of storage system and the protocols used to store the files in the storage system, the locator module 303 may use different approaches to determine a physical location of client requested data. For a logical file, the locator module 303 may determine the physical location of the file based on the definition of the logical file. For instance, the locator module 303 may first determine the logical directory of the file, then check the definition of the determined logical directory to find the physical location of the file in the definition.

In some embodiments, the locator module 303 may directly check metadata for the requested data to identify the physical location of the requested data. File systems maintain metadata for each file that indicates the physical disk locations of the content logically stored in the file. For example, in UNIX file systems, an inode is associated with each file and stores metadata about the file. In some embodiments, the metadata for a file or data may include information such as access permissions, time of last access of the file, time of last modification of the file, and which blocks store its content. The file systems may also maintain a map, referred to as a free map in UNIX file systems, of all the blocks on the physical storage system at which the file system may store content. The file system tracks which blocks in the map are currently in use to store file content and which are available to store file content. The locator module 303 may therefore track back to the file system, through communication with the user application 101 and/or the logical volume manager 103, to identify the corresponding metadata of the requested file or data, from which to identify the physical location of the requested file or data.

Through the above-discussed approaches, the locator module 303 may only identify a physical location where the requested data is stored in the primary storage 107 of the clustered storage system 100. In some embodiments, the locator module 303 may then communicate with the HA primary storage 203 of the corresponding primary storage 107 to identify a physical location where the duplicated data is stored in the secondary storage 109.

In some embodiments, the locator module 303 may additionally determine a distance between the secondary server 113 where the request is allocated and the physical locations of the requested data. In a clustered storage system with duplicated data, the locator module 303 may determine a first distance between the secondary server 113 and a primary storage 107 containing the requested data, and determine a second distance between the secondary server 113 and a secondary storage 109 containing the duplicated data. In some embodiments, the locator module 303 may compare the second distance to the first distance, and determine the secondary storage 109 is in close proximity to the allocated secondary server 113 if the second distance is much smaller than the first distance. In some embodiments, the locator module 303 may determine a threshold of the second distance to determine whether the secondary storage 109 is in close proximity to the allocated secondary server 113. For instance, the locator module 303 may determine the secondary storage 109 is in close proximity to the allocated secondary server 113 if a secondary storage 109 containing the duplicated requested data is within a fixed distance of the allocated secondary server 113, such as, within 10 feet, 100 feet, 1000 feet, 1 mile, 5 miles, 100 miles, 1000 miles, etc. In some embodiments, instead of using a physical distance, a latency (e.g., in msec.) in data transfer may be used by the locator module 303 to determine whether the secondary storage 109 containing the duplicated requested data is in close proximity to the allocated secondary server 113.

The sync detector module 305 includes software, code, logic, or routines that determine the synchronization status of primary storage 107 and secondary storage 109 associated with requested data. A discussed above, the primary storage 107 and the secondary storage 109 are mirrored logical volumes, in which the secondary storage 109 is a replica of the primary storage 107. For a data write sync replication 210, the primary storage 107 may receive an acknowledgment after the completion of the sync replication process. The sync detector module 305 may therefore directly communicate with the corresponding primary storage 107 to determine whether a necessary acknowledgment is received, and to determine whether the corresponding primary storage 107 and secondary storage 109 are in-sync or not.

The switch module 307 includes software, code, logic, or routines that determine working stages of the direct secondary interface module 117. As discussed with reference to FIG. 4, the direct secondary interface module 117 may have two different working stages. The switch module 307 may communicate with other components of the direct secondary interface module 117 to determine which working stage the direct secondary interface module 117 should be switched to, as further discussed in FIG. 4.

Figure 4:
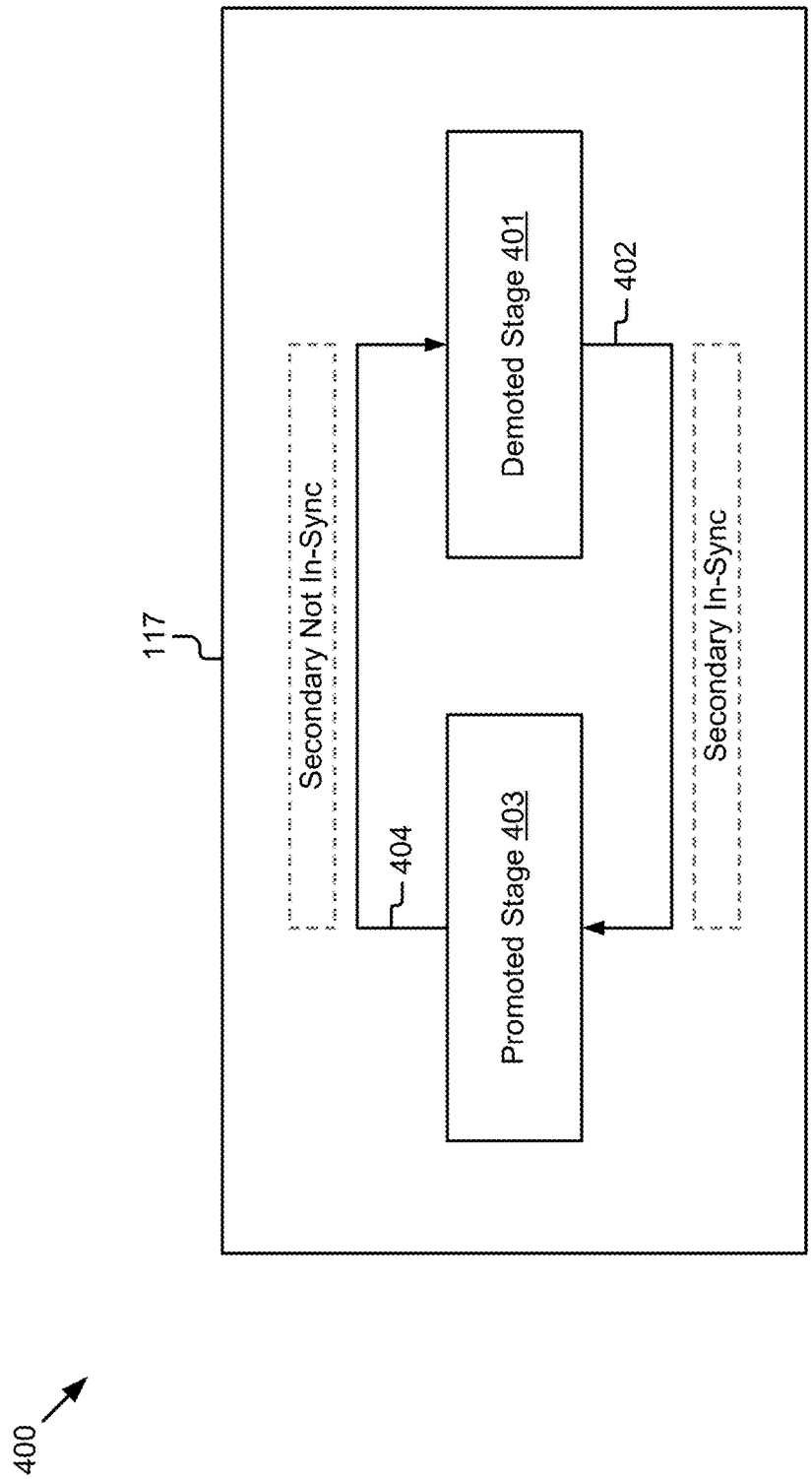
FIG. 4 is a block diagram illustrating an example switching of the direct secondary interface module between two different working stages.

FIG. 4 illustrates an example switching of the direct secondary interface module 117 between two different working stages. As illustrated in the figure, the direct secondary interface module 117 may have two different working stages, a demoted stage 401 and a promoted stage 403. The switching between the two stages 401 and 403 may be determined based on the synchronization status between the primary storage 107 and the secondary storage 109. The switch module 307 may communicate with the sync detector module 305 to determine the synchronization status. For instance, information collected from the sync detector module 305 may indicate that the primary storage 107 and the secondary storage are in-sync condition 402. Relying on this information, the switch module 307 may switch the direct secondary interface module 107 to the promoted stage 403. However, if the collected information indicates that the primary storage 107 and the secondary storage 109 are not in-sync 404, the switch module 307 may then switch the direct secondary interface module 117 to the demoted stage 401. The promoted and demoted stages of the direct secondary interface module 117 may directly affect the routing capacity of the direct secondary interface module 117. In the demoted stage 401, the direct secondary interface module 117 may only route a client-initiated data request to a target 115 of a primary server 111 for accessing the data in a primary storage 107. However, in the promoted stage 403, the direct secondary interface module 117 may either route a request to a target 115 in a primary server 111, or directly route a request to a secondary storage 109, depending on other information in the clustered system 100 and the data request information, as discussed elsewhere herein.

Returning back to FIG. 3, the routing module 309 includes software, code, logic, or routines that route the client-initiated data requests to the primary storage 107 or secondary storage 109 for data access. In the clustered storage system 100, both the primary storage 107 and the secondary storage 109 may contain the requested data. The routing module 309 may rely on information collected from other components of the direct secondary interface module 117 to determine whether to route a request to the primary storage 107 or to the secondary storage 109. For instance, the routing module 309 may communicate with the switch module 307 to determine that the direct secondary interface module 117 is in the demoted stage, and thus route the client-initiated data requests to a primary server 111. In another instance, the routing module 309 may determine the direct secondary interface module 117 is in the promoted stage by communicating with the switch module 307. The routing module 309 may thus communicate further with the sync detector module 305, the locator module 303, and/or the request identification module 301 of the direct secondary interface module 117, to determine to route a client-initiated read request to a secondary storage 109 for data access.

Figure 5:
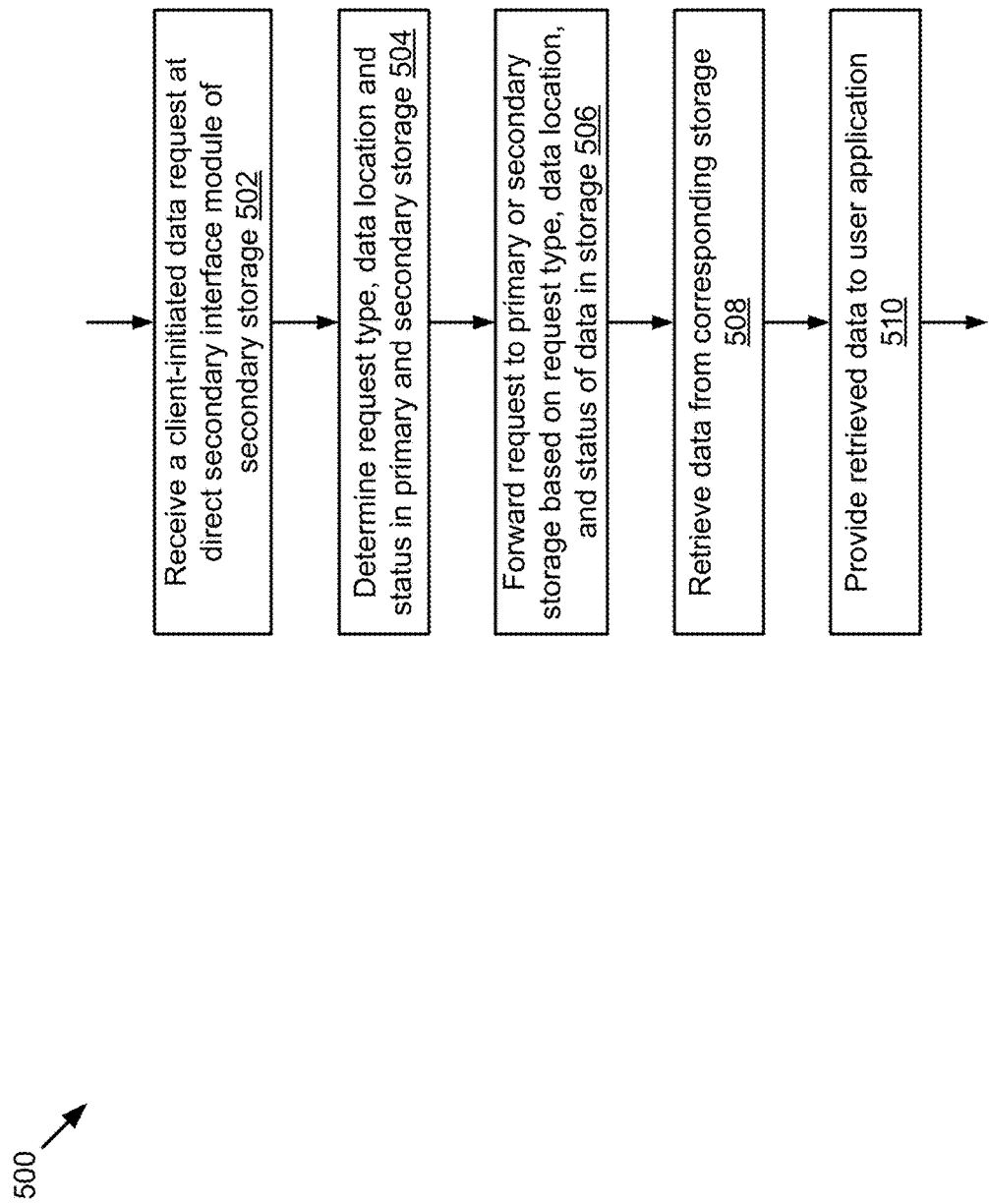
FIG. 5 is a flow chart of an example general method for handling a client-initiated data request in a highly available clustered storage system.

FIG. 5 illustrates an example general method 500 for handling a client-initiated data request in a highly available clustered storage system 100. At step 502, the method 500 may receive a client-initiated data request at a direct secondary interface module 117 of a secondary server 113. The client-initiated data request may be initiated through the user application 101, and allocated to the secondary server 113 by the logical volume manager 103.

At step 504, the method 500 may determine request information. For example, request information may include a request type, a synchronization status of the primary storage 107 and the secondary storage 109 associated with the requested data, and a location of the secondary storage 109 associated with the requested data relating to the allocated secondary server 113 and other factors related to processing the client-initiated data request. The method 500 also determines where to route the client-initiated data request based on the determined request information. One example of step 504 is shown and discussed in more detail below with reference to FIG. 6.

At step 506, the method 500 forwards the request to either the primary storage 107 or the secondary storage 109 based on the request type, data location, and status of the data in storage. Again, one example of step 506 is shown and discussed in more detail below with reference to FIG. 6. The method 500 then continues by retrieving 508 the requested data from the primary storage 107 or the secondary storage 109 to which the request was sent. The method 500 sends the data to the corresponding server 111, 113, and then to the logic volume manager 103. The method 500 completes by providing 510 the retrieved data from the logic volume manager 103 to the user application 101.

Referring now also FIG. 6, an example method 504 for determining a request type, a synchronization status of the primary storage 107 and the secondary storage 109 associated with the requested data, and a location of the secondary storage 109 relating to the allocated secondary server 113, and for forwarding 506 the request to the primary storage 107 or the secondary storage 109 will be described. More specifically, the process for the direct secondary interface module 117 to route a client-initiated data request will be described. Initially, the secondary server 113 receives a client-initiated data request at step 502, as has been described above. Upon receiving the request, the direct secondary interface module 117 may first determine a type of the client-initiated data request at step 602. If the request is not a read request, the direct secondary interface module 117 may route the client-initiated data request to the primary server 111 at step 604. If the request is a read request, the direct secondary interface module 117 may further determine 606 whether the location of a secondary storage associated with the requested data is in close proximity to the allocated secondary server 113, or directly attached to the allocated secondary server 113. For example, is the secondary storage 109 where the requested data is located close to the direct secondary interface module 117 of the allocated secondary server 113? If the secondary storage associated with the requested data is not directly attached to, or not in close proximity to the allocated secondary server 113, the direct secondary interface module 117 may route the client-initiated data request to the primary server 111, as shown by the transition in the method from step 606 to 604. If, however, the secondary storage associated with the requested data is directly attached to, or in close proximity to the allocated secondary server 113, the direct secondary interface module 117 may further determine 608 the synchronization status between the secondary storage 109 and the primary storage 107 associated with the requested data. If the data in the two storages are out of synchronization, the method may again route the client-initiated data request to the primary server 111 associated with the primary storage 107 as shown by the transition from block 608 to block 604. However, if the data in the two storages are in synchronization, the method may route the client-initiated data request to the secondary storage 109, and the secondary storage processes the request to return the data.

Figure 6:
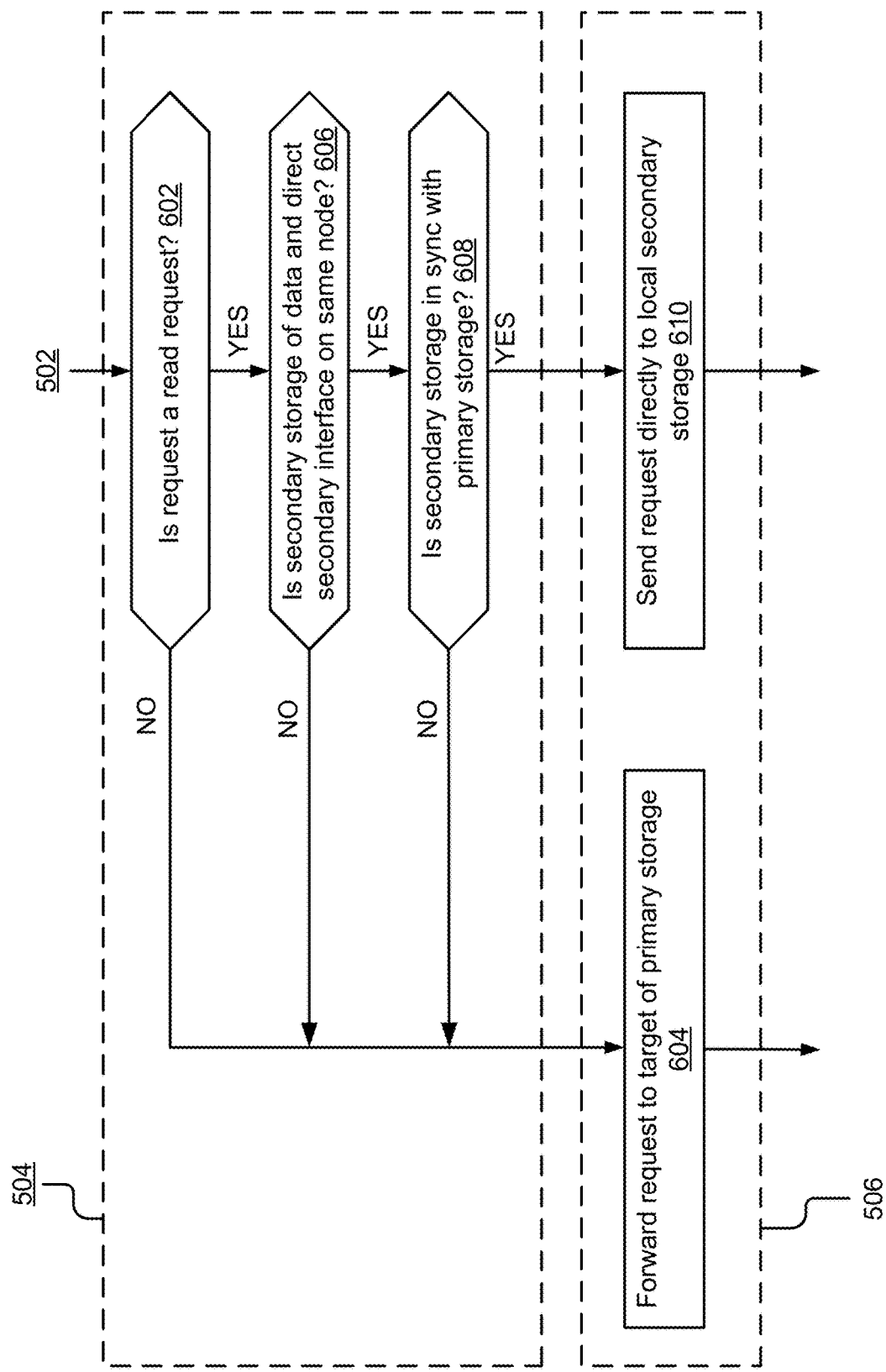
FIG. 6 is a flow chart of an example method for the direct secondary interface module to route a client-initiated data request.

It should be noted that method 504, 506 may perform some or all of the illustrated steps in an order which may not be exactly the same as illustrated in FIG. 6. For instance, the method 504 may first determine the synchronization status of the primary storage 107 and the secondary storage 109 associated with the requested data at step 608 before determining the request type 602. For another instance, the method 504, 506 may not determine the synchronization status of the primary storage 107 and the secondary storage 109 associated with the requested data, since the direct secondary interface module 117 has already been determined to work in the promoted stage 403. However, for whatever order and steps are performed in the method 504, 506, the method may ultimately determine to route a client-initiated data request to a secondary storage 109 under different certain circumstances based on different configurations.

Figure 7:
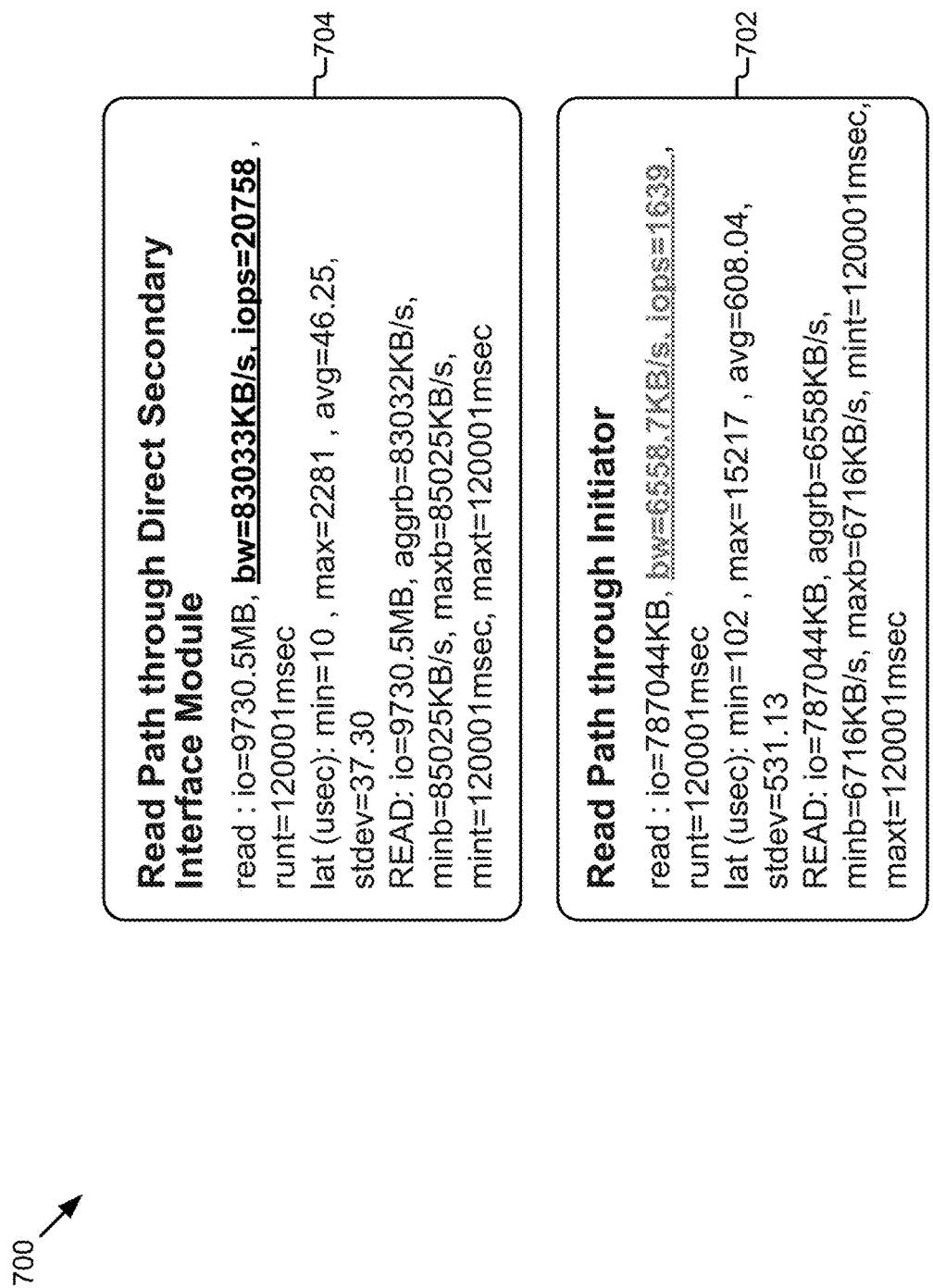
FIG. 7 is a graph illustrating an example of improved performance by a highly availability clustered storage system containing the direct secondary interface module.

FIG. 7 is a graph illustrating an example of improved performance by a HA clustered storage system 100 containing the direct secondary interface module 117. The block 702 illustrates a prior art outcome of a read I/O latency test for a file through a read path mediated by an initiator 217 as illustrated in the prior art system 200. The block 704 illustrates an outcome of a test for the same file through a read path mediated by the direct secondary interface module 117 as illustrated in the currently disclosed system 250. From the data in the graph, it can be observed that the read I/O bandwidth has increased from 6558.7 KB/s in the prior art system 200 to 83033 KB/s in the currently disclosed system 250. The read latency average has decreased from 608.04 μsec to 46.25 μsec. Simultaneously, the I/O per second (IOPS) has also improved from 1639 to 20758. These and other comparison data in the blocks 702 and 704 together suggest an improved performance of the disclosed system, due to efficient data access in a secondary storage of a highly available clustered storage. It should be noted that the data presented in FIG. 7 is only for interpretation purposes, and represent results from only one experimental setup. The exact data from actual executions may vary from setup to setup. Hence, the performance numbers in the figure are only indicative, but not a prefect representation. It should be understood that other results from different experimental setups exist, to show the improved performance of the currently disclosed system 250.

Systems and methods for efficiently accessing a secondary storage in highly available clustered storage environment have been described. In the above description, for purposes of explanation, numerous specific details were set forth. It will be apparent, however, that the disclosed technologies can be practiced without any given subset of these specific details. In other instances, structures and devices are shown in block diagram form. For example, the disclosed technologies are described in some implementations above with reference to user interfaces and particular hardware. Moreover, the technologies disclosed above are primarily in the context of flash arrays. However, the disclosed technologies apply to other data storage devices.

Reference in the specification to "one embodiment", "some embodiments" or "an embodiment" means that a particular feature, structure, or characteristic described in connection with the embodiment is included in at least some embodiments of the disclosed technologies. The appearances of the phrase "in some embodiments" in various places in the specification are not necessarily all referring to the same embodiment.

Some portions of the detailed descriptions above were presented in terms of processes and symbolic representations of operations on data bits within a computer memory. A process can generally be considered a self-consistent sequence of steps leading to a result. The steps may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers, or the like.

These and similar terms can be associated with the appropriate physical quantities and can be considered labels applied to these quantities. Unless specifically stated otherwise as apparent from the prior discussion, it is appreciated that throughout the description, discussions utilizing terms for example "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may include a general-purpose computer selectively activated or reconfigured by a computer program stored in the computer.

The disclosed technologies can take the form of an entirely hardware implementation, an entirely software implementation or an implementation containing both software and hardware elements. In some implementations, the technology is implemented in software, which includes but is not limited to firmware, resident software, microcode, etc.

Furthermore, the disclosed technologies can take the form of a computer program product accessible from a non-transitory computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A computing system or data processing system suitable for storing and/or executing program code will include at least one processor (e.g., a hardware processor) coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the processes and displays presented herein may not be inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the disclosed technologies were not described with reference to any particular programming language. It will be appreciated that a variety of programming languages may be used to implement the teachings of the technologies as described herein.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be implemented in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present technology can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future in computer programming. Additionally, the present techniques and technologies are in no way limited to implementation in any specific programming language, or for any specific operating system or environment. Accordingly, the disclosure of the present techniques and technologies is intended to be illustrative, but not limiting.

What is claimed is:

1. A system for efficiently accessing data in a highly available clustered storage, the system comprising:
    a secondary server configured to receive, process, and distribute a client-initiated data request for accessing data;
    a primary server coupled to the secondary server to receive the client-initiated data request and to provide data in response to the client-initiated data request;
    a primary storage coupled to the primary server for providing data responsive to the client-initiated data request via the primary server; and
    a secondary storage coupled to the secondary server for providing data responsive to the client-initiated data request via the secondary server, wherein, responsive to the received client-initiated data request, the secondary server is further configured to:
    determine request information including:
        a request input/output (I/O) type about the client-initiated data request;
        a synchronization status of the primary storage and the secondary storage associated with the request; and
        a location of the secondary storage associated with the request relative to the secondary server;
    determine whether to process the client-initiated data request on the secondary server or on the primary server;
    process the client-initiated data request using the secondary server to retrieve data from the secondary storage responsive to determining that:
        the request I/O type of the client-initiated data request is a read request;
        the primary storage and secondary storage associated with requested data are in synchronization; and
        the location of the secondary storage associated with the requested data is within a determined distance to the secondary server; and
    forward the client-initiated data request to the primary server to process the client-initiated data request responsive to determining that:
        the request I/O type of the client-initiated data request is not a read request;
        the primary storage and the secondary storage associated with the requested data are not in synchronization; or
        the location of the secondary storage associated with the requested data is not within the determined distance to the secondary server.

2. The system of claim 1, wherein:
    the secondary server comprises a direct secondary interface module configured to retrieve requested data directly from the secondary storage.

3. The system of claim 2, wherein the direct secondary interface module includes a request identification module to determine the request I/O type of the client-initiated data request.

4. The system of claim 2, wherein the direct secondary interface module includes a locator module to determine the physical location of data corresponding to the client-initiated data request from a pool of storage devices including the primary storage and the secondary storage.

5. The system of claim 2, wherein the direct secondary interface module includes a sync detector module to detect whether the primary storage and the secondary storage are in synchronization.

6. The system of claim 2, wherein the direct secondary interface module includes a switch module for determining a working state to assign to the direct secondary interface module, the working state assigned based on a state of the secondary storage.

7. A computer-implemented method comprising:
    receiving a client-initiated data request at a secondary server of a cluster of servers, the cluster of servers including a primary server coupled to a primary storage and the secondary server coupled to a secondary storage;
    determining request information including:
        a request input/output (I/O) type about the client-initiated data request;
        a synchronization status of the primary storage and the secondary storage associated with the request and
        a location of the secondary storage associated with the request relative to the secondary server;
    determining with the secondary server whether to process the client-initiated data request on the secondary server or on the primary server;
    processing the client-initiated data request by the secondary server to retrieve data from the secondary storage responsive to determining that:
        the request I/O type of the client-initiated data request is a read request secondary server should process the client initiated data request;
        the primary storage and secondary storage associated with requested data are in synchronization; and
        the location of the secondary storage associated with the requested data is within a determined distance to the secondary server; and
    forwarding, by the secondary server, the client-initiated data request to the primary server to process the client-initiated data request responsive to determining that:

the request I/O type of the client-initiated data request is not a read request;

the primary storage and the secondary storage associated with the requested data are not in synchronization; or the location of the secondary storage associated with the requested data is not within the determined distance to the secondary server.

8. The computer-implemented method of claim 7, wherein processing the client-initiated data request by the secondary server includes responding directly to the client-initiated data request by retrieving data from the secondary storage through a direct secondary interface.

9. The computer-implemented method of claim 8, wherein:

the secondary server includes the direct secondary interface; and the determined distance includes the direct secondary interface directly attaching the secondary server to the secondary storage.

10. The computer-implemented method of claim 7, wherein:

the secondary server is clustered with the primary server in a highly available clustered storage system; and the primary storage and the secondary storage are mirrored storage connected through a network.

11. The computer-implemented method of claim 7, wherein determining with the secondary server whether to process the client-initiated data request on the secondary storage includes determining whether the secondary storage and the secondary server are on a same node.

12. The computer-implemented method of claim 7, wherein determining with the secondary server whether to process the client-initiated data request on the secondary storage includes determining a working state to assign to a direct secondary interface between the secondary server and the secondary storage.

13. A system comprising:

a primary server comprising a first processor and a first memory;

a primary storage coupled to the primary server;

a secondary server comprising a second processor and a second memory; and a secondary storage coupled to the secondary server, wherein the secondary server further comprises:

means for receiving a client-initiated data request at the secondary server;

means for determining request information including:

a request input/output (I/O) type about the client-initiated data request;

a synchronization status of the primary storage and the secondary storage associated with the request and a location of the secondary storage associated with the request relative to the secondary server; and means for determining whether to process the client-initiated data request on the secondary server or on the primary server based on the determined request information, wherein:

processing the client-initiated data request by the secondary server to retrieve data from the secondary storage responsive to determining that:

the request I/O type of the client-initiated data request is a read request;

the primary storage and secondary storage associated with requested data are in synchronization; and the location of the secondary storage associated with the requested data is within a determined distance to the secondary server; and forwarding, by the secondary server, the client-initiated data request to the primary server to process the client-initiated data request responsive to determining that:

the request I/O type of the client-initiated data request is not a read request;

the primary storage and the secondary storage associated with the requested data are not in synchronization; or the location of the secondary storage associated with the requested data is not within the determined distance to the secondary server.

14. The system of claim 13, wherein processing the client-initiated data request by the secondary server includes responding directly to the client-initiated data request by retrieving data from the secondary storage through a direct secondary interface.

15. The system of claim 14, wherein:

the secondary server includes the direct secondary interface; and the determined distance includes the direct secondary interface directly attaching the secondary server to the secondary storage.

16. The system of claim 13, wherein:

the secondary server is clustered with the primary server in a highly available clustered storage system; and the primary storage and the secondary storage are mirrored storage connected through a network.

17. The system of claim 13, wherein the means for determining with the secondary server whether to process the client-initiated data request on the secondary storage includes means for determining whether the secondary storage and the secondary server are on a same node.

18. The system of claim 13, wherein the means for determining with the secondary server whether to process the client-initiated data request on the secondary storage includes means for determining a working state to assign to a direct secondary interface between the secondary server and the secondary storage.

19. The computer-implemented method of claim 7, further comprising:

determining the determined distance using a physical distance between the secondary server and the primary storage.

20. The computer-implemented method of claim 7, further comprising:

determining the determined distance using a latency in data transfer between the secondary server and the primary storage.

\* \* \* \* \*